US009208651B2

(12) United States Patent
Jaffe

(10) Patent No.: US 9,208,651 B2
(45) Date of Patent: Dec. 8, 2015

(54) WAGERING GAME APPARATUS AND METHOD WITH ENHANCEMENT PARAMETER DICTATED BY PRIOR PLAY

(71) Applicant: WMS Gaming Inc., Waukegan, IL (US)

(72) Inventor: Joel R. Jaffe, Glenview, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 6 days.

(21) Appl. No.: 13/772,489

(22) Filed: Feb. 21, 2013

(65) Prior Publication Data

US 2013/0331173 A1 Dec. 12, 2013

Related U.S. Application Data

(60) Provisional application No. 61/656,390, filed on Jun. 6, 2012.

(51) Int. Cl.
*A63F 13/00* (2014.01)
*G07F 17/32* (2006.01)

(52) U.S. Cl.
CPC ........ *G07F 17/3267* (2013.01); *G07F 17/3288* (2013.01)

(58) Field of Classification Search
CPC .................................................. G07F 17/3267
USPC ........................................................... 463/21
See application file for complete search history.

(56) References Cited

U.S. PATENT DOCUMENTS

| | | | |
|---|---|---|---|
| 5,823,873 A | 10/1998 | Moody | |
| 5,976,016 A | 11/1999 | Moody et al. | |
| 5,997,401 A | 12/1999 | Crawford | |
| 6,120,378 A | 9/2000 | Moody et al. | |
| 6,159,095 A | 12/2000 | Frohm et al. | |
| 6,203,428 B1 | 3/2001 | Giobbi et al. | |
| 6,270,412 B1 | 8/2001 | Crawford et al. | |
| 6,375,570 B1 | 4/2002 | Poole | |
| 6,561,900 B1 | 5/2003 | Baerlocher et al. | |
| 6,565,433 B1 | 5/2003 | Baerlocher et al. | |
| 6,652,378 B2 | 11/2003 | Cannon et al. | |
| 6,786,819 B2 | 9/2004 | Baerlocher et al. | |
| 6,793,578 B2 | 9/2004 | Luccesi et al. | |
| 6,860,810 B2 | 3/2005 | Cannon et al. | |
| 6,918,832 B2 | 7/2005 | Baerlocher et al. | |
| 7,059,604 B1 | 6/2006 | Richards et al. | |
| 7,278,919 B2 | 10/2007 | Souza et al. | |
| 7,322,887 B2 | 1/2008 | Belger et al. | |
| 7,527,557 B2 | 5/2009 | Jackson | |
| 7,690,976 B2 * | 4/2010 | Edidin et al. | 463/13 |
| 7,758,419 B2 | 7/2010 | Rowe et al. | |
| 2010/0004050 A1 * | 1/2010 | Caputo et al. | 463/21 |
| 2011/0105218 A1 * | 5/2011 | Anderson et al. | 463/20 |

* cited by examiner

*Primary Examiner* — Kang Hu
*Assistant Examiner* — Thomas H Henry
(74) *Attorney, Agent, or Firm* — Nixon Peabody LLP

(57) ABSTRACT

A gaming system for conducting a wagering game includes a display device configured to portray wagering game outcomes indicated by symbols populated in symbol arrays. The gaming system receives a first wager and displays a first symbol array to indicate the outcome for the first wager. The gaming system receives a second wager and displays a second symbol array to indicate the outcome for the second wager. During portrayal of the second outcome, the first symbol array is displayed simultaneously with the second symbol array, and the first symbol array is modified according to one or more symbols in the second symbol array. The gaming system provides an award according to the improvement, if any, in the second symbol array resulting from the modification.

20 Claims, 8 Drawing Sheets

WAGERING GAME APPARATUS AND METHOD WITH ENHANCEMENT PARAMETER DICTATED BY PRIOR PLAY

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to apparatus and methods of playing a wagering game with outcomes determined in part based on prior game play outcomes.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player

SUMMARY OF THE INVENTION

According to one aspect of the present invention, a gaming system for conducting a wagering game includes at least one wager input device for receiving an indication of a wager; at least one processor, at least one display device, and at least one memory device storing instructions. The instructions are such that, when executed by the at least one processor, the gaming system is caused to: display, via the at least one display device, a randomly populated first symbol array responsive to a receipt of an input, via the input device, indicative of a first wager; provide a first award, if any, associated with the first symbol array; display, via the at least one display device, a randomly populated second symbol array responsive to a receipt of an input, via the input device, indicative of a second wager, while concurrently display the first symbol array on the at least one display device; provide a second award, if any, associated with the second symbol array; modify one or more symbols in the first symbol array based at least in part on one or more symbols in the second symbol array, thereby generating a modified first symbol array; and provide a third award, if any, associated with the modified first symbol array.

According to another aspect of the present disclosure, a computer-implemented method of operating a gaming system is provided. The method can include receiving an input, via an input device, indicative of a first wager; displaying a first randomly generated symbol array on one or more display devices responsive to the first wager; providing, via one or more processors, a first award, if any, associated with the first symbol array; receiving an input, via the input device, indicative of a second wager; while displaying the first symbol array and in response to the second wager, displaying a second randomly generated symbol array on the one or more display devices; providing, via at least one of the one or more processors, an award, if any, associated with the second symbol array; modifying one or more symbols in the first symbol array based on one or more symbols in the second symbol array to thereby generate a modified first symbol array; and providing, via at least one of the one or more processors, an award, if any, associated with the modified first symbol array.

In a further aspect to the aforementioned computer-implemented method, the modifying includes replacing the one or more symbols in the first array with one or more symbols in the second array arranged at positions in the second array corresponding to the positions of the one or more symbols in the first symbol array. In yet another aspect, further to the preceding aspect, the act of replacing is carried out responsive to the one or more symbols in the second symbol array being one or more replacement symbols. Yet further, the one or more replacement symbols optionally include a wild symbol.

In a further aspect to the aforementioned computer-implemented method, the third award is provided according to an increase in value, if any, between the first symbol array and the modified first symbol array, wherein the increase in value is determined according to a pay table that maps populated symbol arrays to award amounts.

In yet a further aspect to the aforementioned computer-implemented method, the third award is provided according to a value associated with the modified first symbol array according to a pay table, and wherein the first award and second award are provided according to values associated with the first symbol array and second symbol array, respectively, according to the pay table.

In yet a further aspect to the aforementioned computer-implemented method, the third award is based, at least in part, on the first wager.

In yet a further aspect to the aforementioned computer-implemented method, the third award is based, at least in part, on the second wager.

In yet a further aspect to the aforementioned computer-implemented method, the third award is independent of the second wager.

In yet a further aspect to the aforementioned computer-implemented method, the computer-implemented method further includes receiving an input, via the input device, indicative of a third wager, displaying a third randomly generated symbol array via the at least one display device while concurrently displaying the second symbol array on the at least one display device; providing, via the one or more processors, a fourth award, if any, associated with the third symbol array; modifying one or more symbols in the second symbol array based at least in part on one or more symbols in the third symbol array, thereby generating a modified second symbol array; and providing a fifth award, if any, associated with the modified second symbol array.

In yet a further aspect to the aforementioned computer-implemented method, the computer-implemented method provides an additional award, if any, associated with both the modified first symbol array and the second symbol array simultaneously displayed via the display device, wherein the additional award is determined according to a scatter pay across both the modified first symbol array and the second symbol array.

According to another aspect of the invention, a wagering gaming system is provided. The wagering gaming system can include: an input device; at least one processor configured to conduct a wagering game on the wagering game system; a display device; and at least one memory device. The memory device can store instructions that, when executed by the at least one processor, cause the gaming system to: receive an input, via the input device, indicative of a wager; randomly determine an outcome of the wagering game, the outcome of the wagering game indicated by a plurality of symbols; display the outcome in a first symbol array displayed on the display device; display on the display device, while displaying the first symbol array, a second symbol array indicating a prior outcome from a prior wagering game; modify an award indicated by the second symbol array based at least in part on one or more symbols in the first symbol array, such that the second symbol array is associated with a current award greater than a prior award, if any, associated with the second symbol array during the prior wagering game according to the prior outcome; provide at least one of the current award or a difference between the current award and the prior award.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
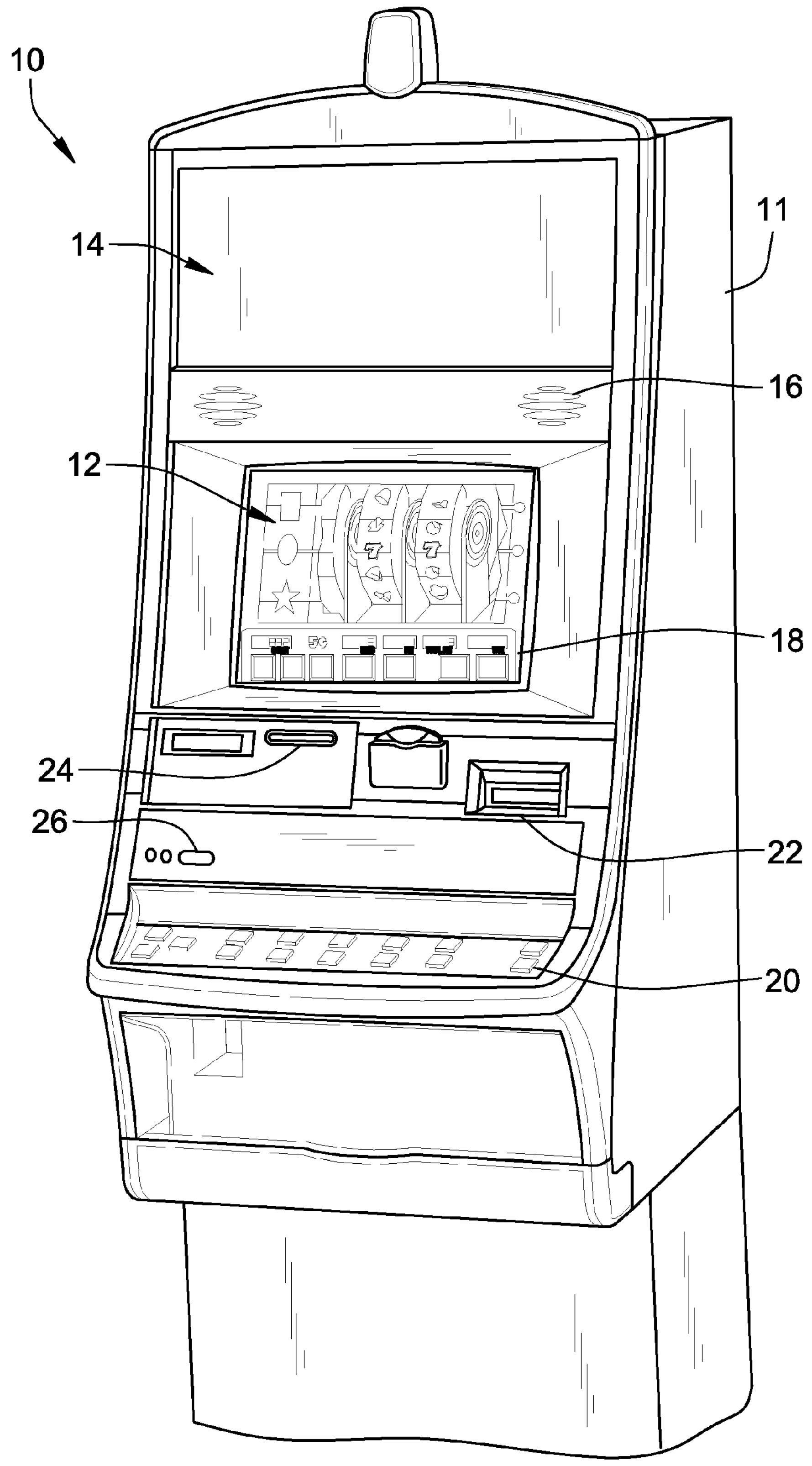
FIG. 1 (PRIOR ART)
FIG. 1 is a perspective view of a free-standing gaming terminal according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0062190 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s)

and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
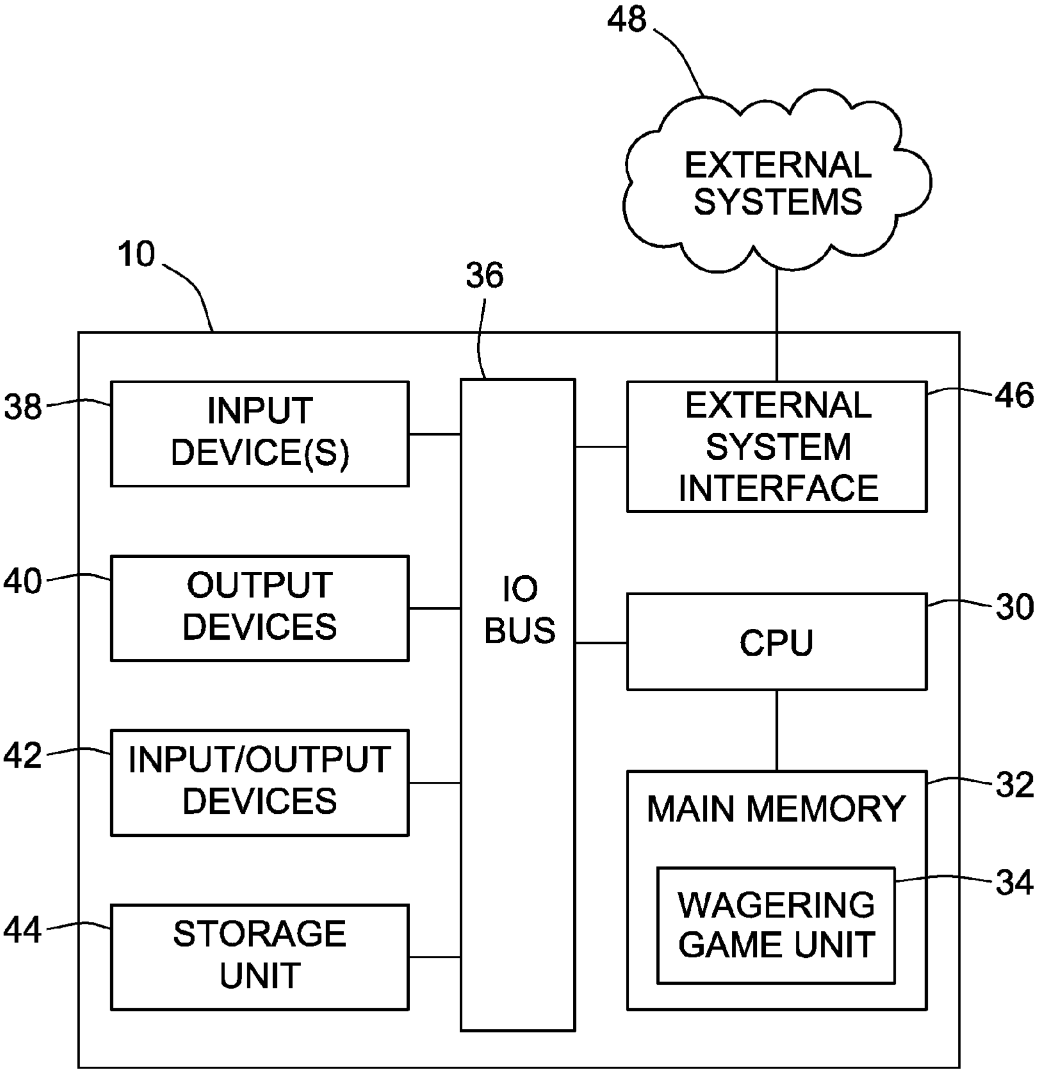
FIG. 2 (PRIOR ART)
FIG. 2 is a schematic view of a gaming system according to an embodiment of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
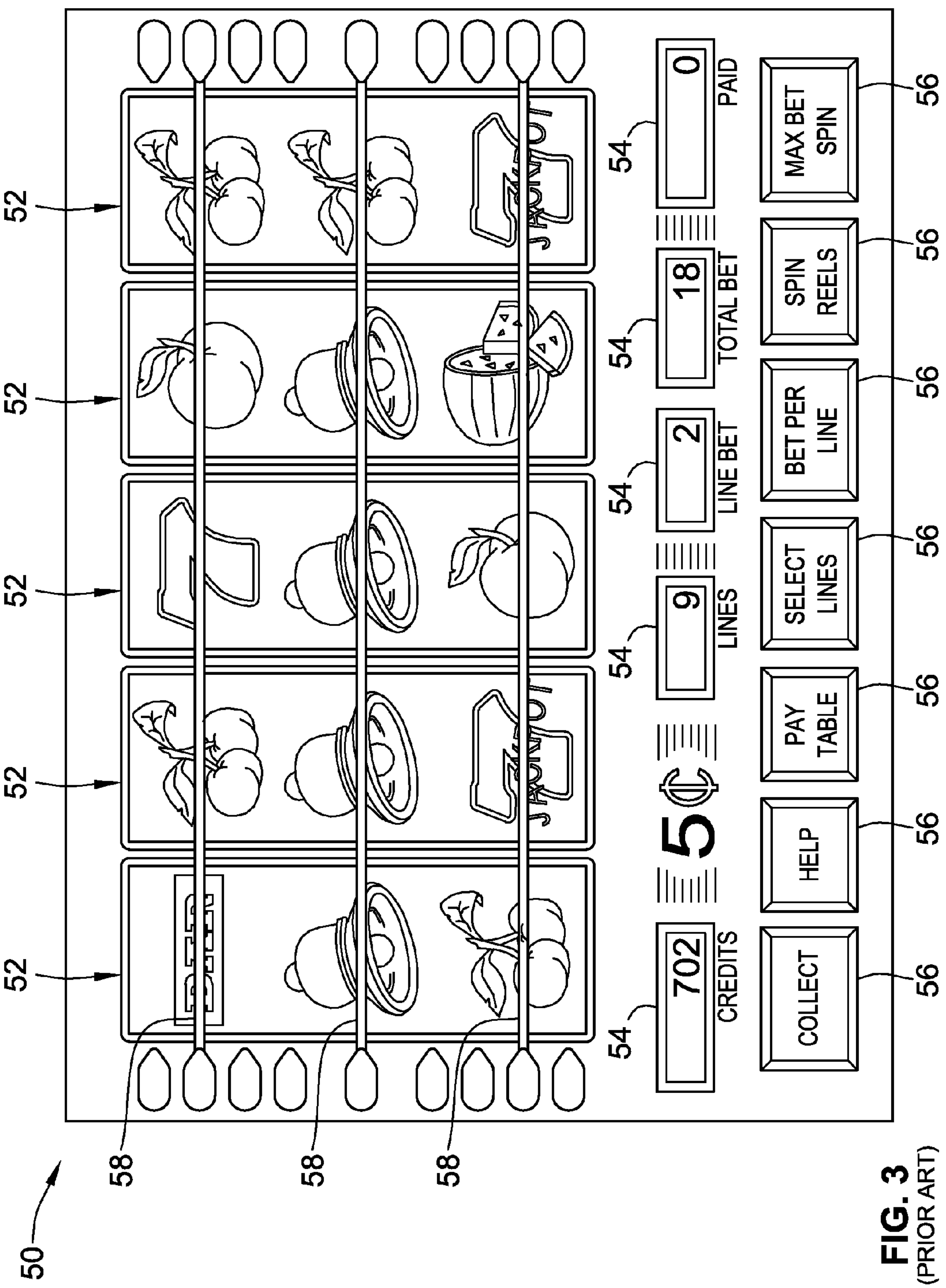
FIG. 3 (PRIOR ART)
FIG. 3 is an image of an exemplary basic-game screen of a wagering game displayed on a gaming terminal, according to an embodiment of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
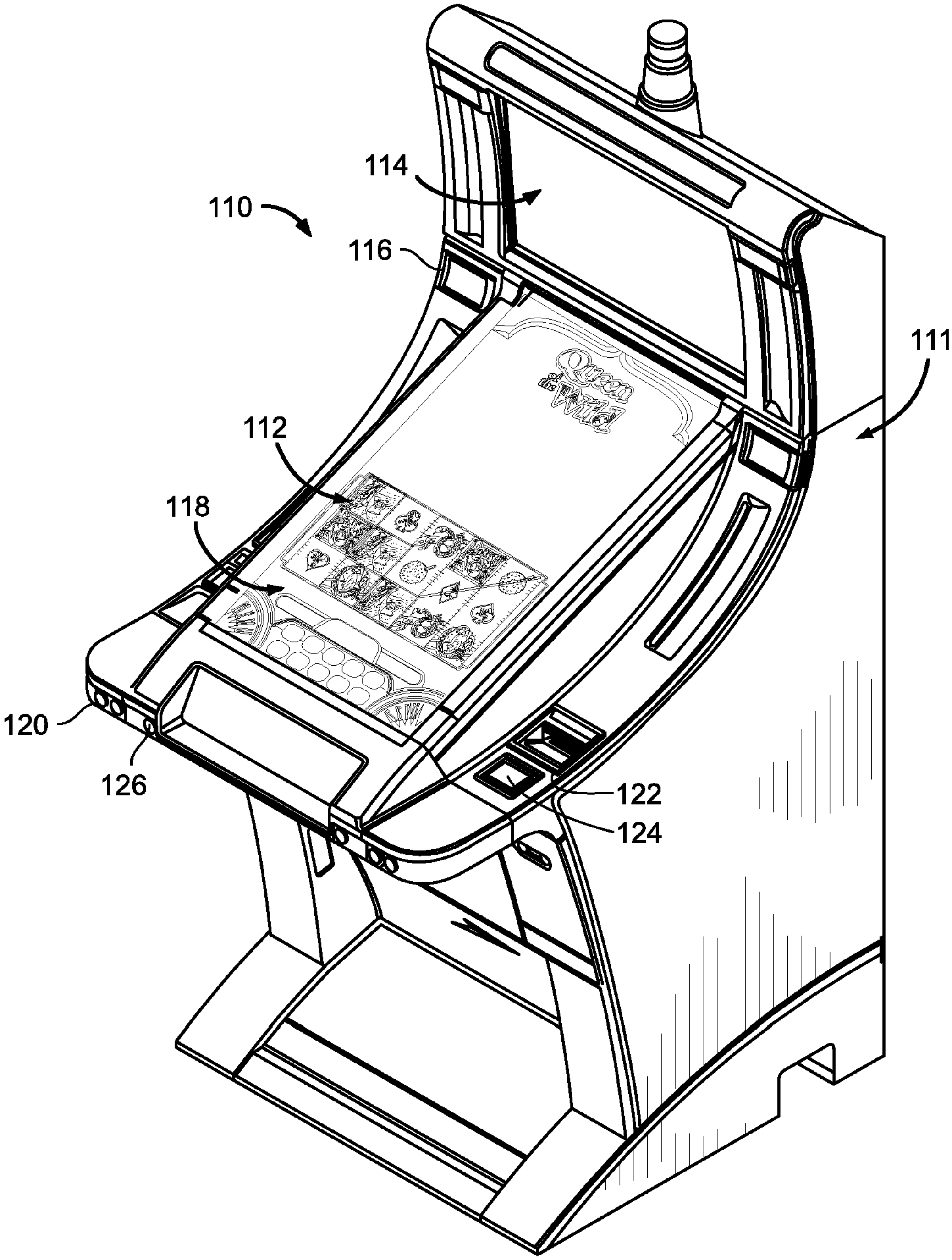
FIG. 4 is a perspective view of a free-standing gaming terminal including a primary display area with a video display configured for portraying a wagering game outcome according to the present disclosure.

Referring now to FIG. 4, which is a perspective view of a free-standing gaming terminal 110 including a primary display area 112 and a secondary display area 114 situated generally in a cabinet 111. Similar in some respects to the gaming terminal 10 of FIG. 1, the gaming terminal 110 includes audio speaker(s) 116, a bill validator 122, an information reader/writer 124, and one or more information ports 126 for conveying information to (and receiving information from) a player of the gaming terminal 110. However, the gaming terminal 110 provides a different form factor than the gaming terminal 10 shown in FIG. 1 and described above. For example, the primary display area 112 of the gaming terminal 110 can be substantially larger, in a vertical direction, than the primary display area 12 of the previously described gaming terminal 10 shown in FIG. 1.

The primary display area 112 of the gaming terminal 110 shown in FIG. 4 is situated to advantageously provide an interactive sensory experience for a player. For example, by being disposed (e.g., mounted) in the cabinet 111 such that an outward surface of the primary display area 112 defines a plane making an acute angle with a ground surface, while the gaming terminal 110 rests on the ground, a player of the gaming terminal 110 is generally invited to lean over the gaming terminal 110 and thereby become more engaged in the wagering game played thereon. Similar to the primary display area 12 of the gaming terminal 10 shown in FIG. 1, the primary display area 112 can include one or more mechanical reels and/or moving parts and can include one or more light emissive and/or light transmissive displays. The primary display area 112 can thus present a combination of displays and/or mechanical elements configured to portray an outcome of a wagering game. Furthermore, the primary display area 112 can include a touch-sensitive screen 118 defining touch-activated buttons and/or or regions to allow the player to provide user inputs using, for example, touches, gestures, motions, etc. across the touch-sensitive screen 118 to thereby operate a wagering game provided via the gaming terminal 110.

In FIG. 4, the primary display area 112 portrays an exemplary portrayal of a wagering game outcome. The primary display area 112 includes a video display mounted in the gaming terminal 110 to provide video content in the primary display area 112. Exemplary portrayals of wagering game outcomes described herein are provided by displaying video content on the video display mounted in the primary display area 112. In the portrayal in FIG. 4, a single 3 by 5 symbol array is populated with symbols and a payline is highlighted indicating the presence of a winning combination in the 3 by 5 symbol array. The portrayal of one or more populated symbol arrays to depict an outcome of the wagering games will be described below in connection with FIGS. 5-8, which are depictions of the video display during stages of the outcome portrayals described herein. In one embodiment, each column in the array is associated with a respective reel that rotates and stops to display symbols along that column. In another embodiment, each symbol position in the array is associated with a respective reel that rotates and stops to display a single symbol in that symbol position. While the portrayal of a wagering game outcome on one or more 3 by 5 symbol arrays is described herein in connection with the gaming terminal 110 of FIG. 4, it is envisioned that alternatives may use alternative form factors with alternative primary display areas, such as the gaming terminal 10 having the primary display area 12 shown in FIG. 1, for example.

The video content displayed on the primary display area 112 of a gaming terminal 110 can be provided by a flat panel display mounted in the cabinet of the gaming terminal 110, such as an LCD, plasma, OLED, LED, or similar display technology allowing for selective light reflection, transmission, and/or emission to produce video content. Video content on such a flat panel display can be provided via a video driver configured to render display information according to a video data stream. The video data stream, in combination with the video driver and the video display, generate moving images to render the dynamic population, movement, and/or modification of symbols in the symbol arrays described in connection with FIGS. 5-8. Thus, while the various wagering game outcome portrayals described in connection with the depictions of FIGS. 5-8 refer to features in motion, and which move, stop, or otherwise change dynamically, it is noted that such movement described herein is generally simulated movement, portrayed by providing appropriate video content on the video display to cause various displayed features to appear in motion.

Generally, the wagering game is operated such that in response to receiving a user input to initiate the wagering game, an outcome of the wagering game is determined, such as via an RNG, similar to the process described in connection with FIGS. 1-3. To portray the determined outcome, a plurality of symbols are randomly populated in symbol positions of one or more symbol arrays, at least some of which indicate the determined outcome represented in a pay table associated with the symbol arrays. The population of the symbol positions of the one or more symbol arrays is thus generally carried out to portray a randomly determined wagering game outcome. The determination is generally carried out to provide a desired expected value for the wagering game, over time, and which may be at least partially specified and/or regulated by one or more regulatory authorities.

In some instances a wagering game is portrayed by populating and displaying a symbol array while a symbol array for an earlier game portrayal is still displayed. In some instances, the symbol array for the earlier game portrayal is modified based on the more recent symbol array, and an award is provided that corresponds to the earlier symbol array, as modified. Thus, some wagering games disclosed herein can provide for outcome(s) in previous game play(s) to be modified by outcomes of current game plays. In some examples, the manner in which the earlier game outcome(s) (e.g., symbol array(s)) are modified and/or the manner in which the awards are provided for the modified earlier game outcome(s) (e.g., symbol array(s)) can be dependent on bonus features, game outcomes, community events, wager amounts, combinations thereof, etc. An exemplary, non-limiting portrayal of a wagering game that allows for modifying earlier outcome(s) (e.g., symbol array(s)) based on current outcome(s) (e.g., symbol array(s)) is described in connection with FIGS. 5-8.

Figure 5:
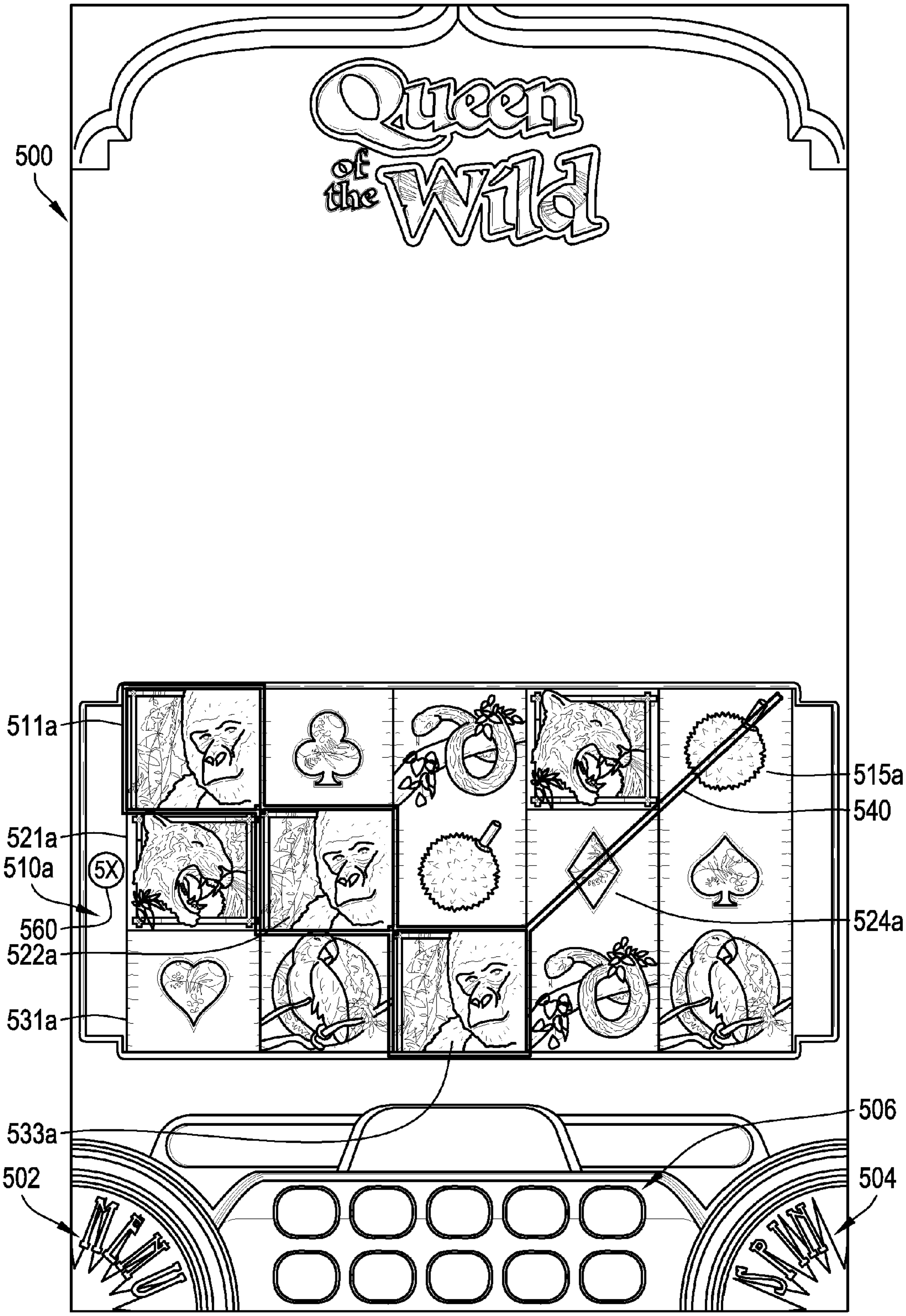
FIG. 5 is a depiction of an exemplary portrayal of a wagering game outcome that can be provided on the primary display area of the gaming terminal shown in FIG. 4.

FIG. 5 is a depiction 500 of an exemplary portrayal of a wagering game outcome that can be provided on the video display in the primary display area 112 of the gaming terminal shown in FIG. 4. The depiction 500 includes touch-sensitive inputs 502, 504, a results display 506, and a symbol array 510*a*. The touch-sensitive inputs include a menu button 502 and a spin button 504. The results display region 506 includes a set of boxes ("windows") for displaying various features or information related to game play, such as credits acquired, credits remaining, bonus and/or community event status, etc. The depicted symbol array 510*a* has three rows and five columns populated by a plurality of symbols randomly selected from a set of available game symbols and arranged to correspond to a randomly generated outcome for the wagering game. The symbol array includes a matrix of symbol positions arranged in rows and columns. In the exemplary arrangement shown in the screenshot 500, the symbol array 510*a* is a 3×5 array, but in other examples the symbol array can have other dimensions such as a 4×5 array, a 3×4 array, or a n×m array wherein n and m could be any number, including the same number. Moreover, the concepts herein are not limited to reels or arrays of symbol positions and equally apply to any form of symbolic presentation of wagering game outcomes (e.g., playing card symbols in a poker-based wager game, etc.).

For example, in the exemplary wagering game outcome depicted in FIG. 5, a selected payline 540 is shown to include GORILLA symbols populating the first row, first column position 511*a*, the second row, second column position 522*a*, the third row, third column position 533*a*. The selected payline 540 is also shown to include the second row, fourth column position 524*a*, populated by a DIAMOND symbol, and the first row, fifth column position 515*a*, populated by a FRUIT symbol. The outcome of the wagering game portrayed by the populated symbol array 510*a* in FIG. 5 corresponds to an award associated with three GORILLA symbols along the selected payline 540. The remainder of the symbol positions in the symbol array 510*a* are populated with symbols that do not, as shown in FIG. 5, contribute to any payline award.

In the exemplary portrayal shown in FIG. 5, the payline 540 can be indicated as a "winner" by highlighting, in any fashion or manner, the symbols included in the payline 540 that form a winning combination. By way of example, symbol positions 511*a*, 522*a*, 533*a* are highlighted by a border surrounding those symbol positions. Other methods of highlighting the winning combination in the payline 540 could include, but are not limited to, displaying the GORILLA symbols in the positions 511*a*, 522*a*, 533*a* in a contrasting color, luminance, etc. such that the GORILLA symbols appear distinguishable from the surrounding symbols (e.g., the TIGER symbol in the position 510*a*).

Figure 6:
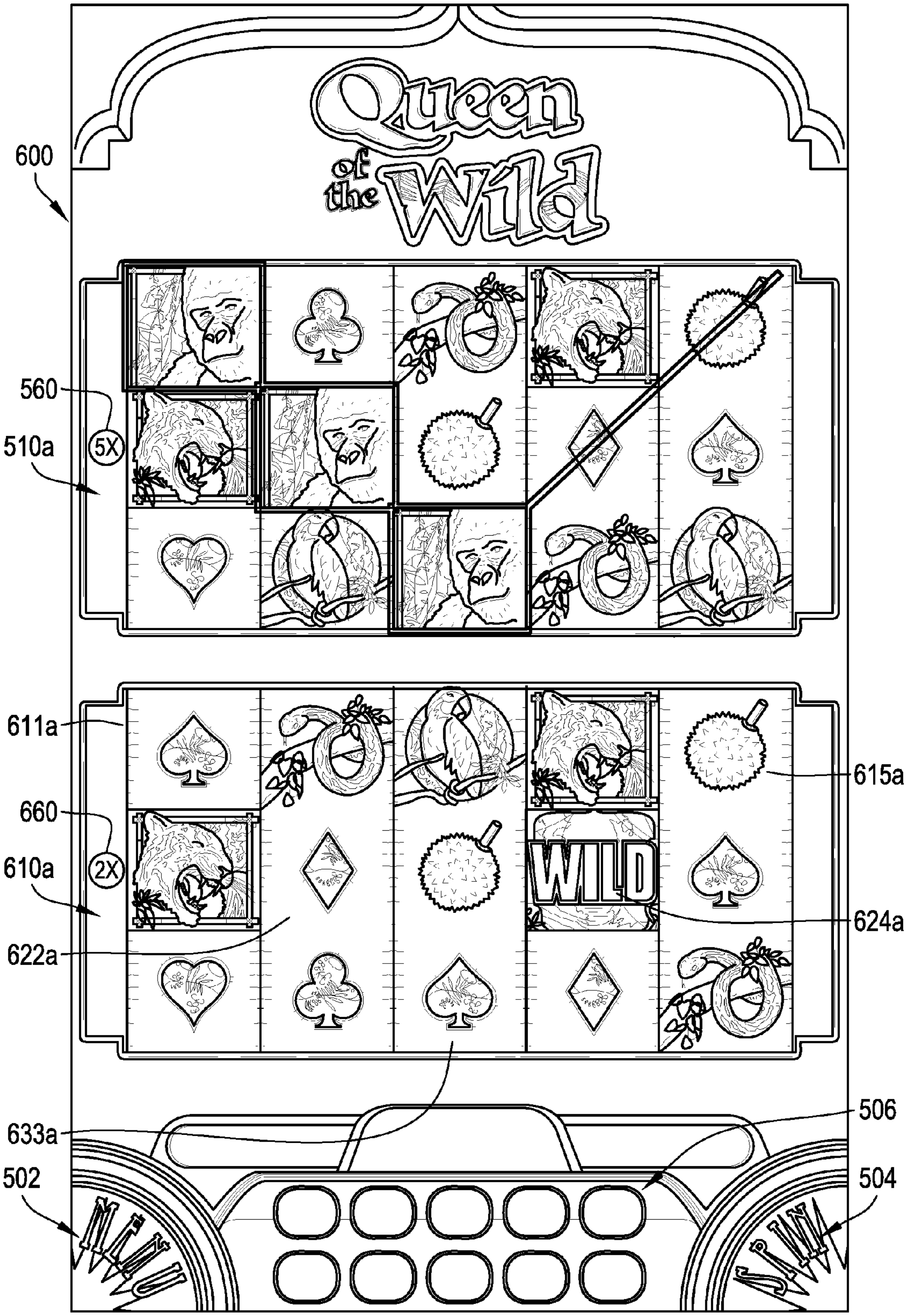
FIG. 6 is a depiction of a first portion of another exemplary portrayal of a wagering game outcome that can follow the wagering game outcome shown in FIG. 5.

FIG. 6 is a depiction 600 of a first portion of another exemplary portrayal of a wagering game outcome that follows the wagering game outcome shown in FIG. 5. FIG. 6 shows two, distinct populated symbol arrays 510*a*, 610*a* displayed simultaneously with the first populated symbol array 510*a* from FIG. 5 shown to be translated vertically relative to its location shown in FIG. 5. In the array position occupied by array 510*a* in FIG. 5, the second symbol array 610*a* is depicted and corresponds to a current wagering game. As shown in FIG. 6, the first symbol array 510*a*, corresponding to a prior wagering game outcome, is disposed vertically above the second symbol array 610*a*, corresponding to a current wagering game outcome. However, this presentation could be reversed, with the first symbol array 510*a* being disposed vertically beneath the second symbol array 610*a*, or laterally presented in a panoramic layout with first symbol array 510*a* being laterally disposed relative to the second symbol array 610*a*. Moreover, the first symbol array 510*a* may optionally be disposed on a different display (e.g., a secondary display, an area display, etc.) than the second symbol array 610*a*.

In some examples, the symbol array 510*a* can be displayed as moving along a path connecting its displayed location in the depiction 500 to its displayed location in the depiction 600. The symbol array 510*a* can also gradually or abruptly appear above its previous location while the second symbol array 610*a* is displayed.

The second symbol array 610*a* is also a three by five symbol array and is populated with a plurality of symbols portraying a randomly determined outcome of the wagering game. The combination of symbols populating the second symbol array 610*a* does not provide a winning combination along any selected paylines for the second symbol array 610*a*.

Although FIG. 6 depicts the current wagering game outcome of symbol array 610*a* in the same scale as the prior wagering game outcome of symbol array 510*a* (from FIG. 5), in various aspects of the present concepts the symbol arrays can be displayed at different relative sizes, such as where the first symbol array 510*a* is rendered at a fraction of its original size and/or a fraction of the size of the second symbol array 610*a* to visually distinguish the symbol arrays. The current wagering game outcome can also be distinguished from prior wagering game outcomes, for example, by rendering the second symbol array 610*a* and the first symbol array 510*a* in contrasting colors and/or contrast ratios.

Figure 7:
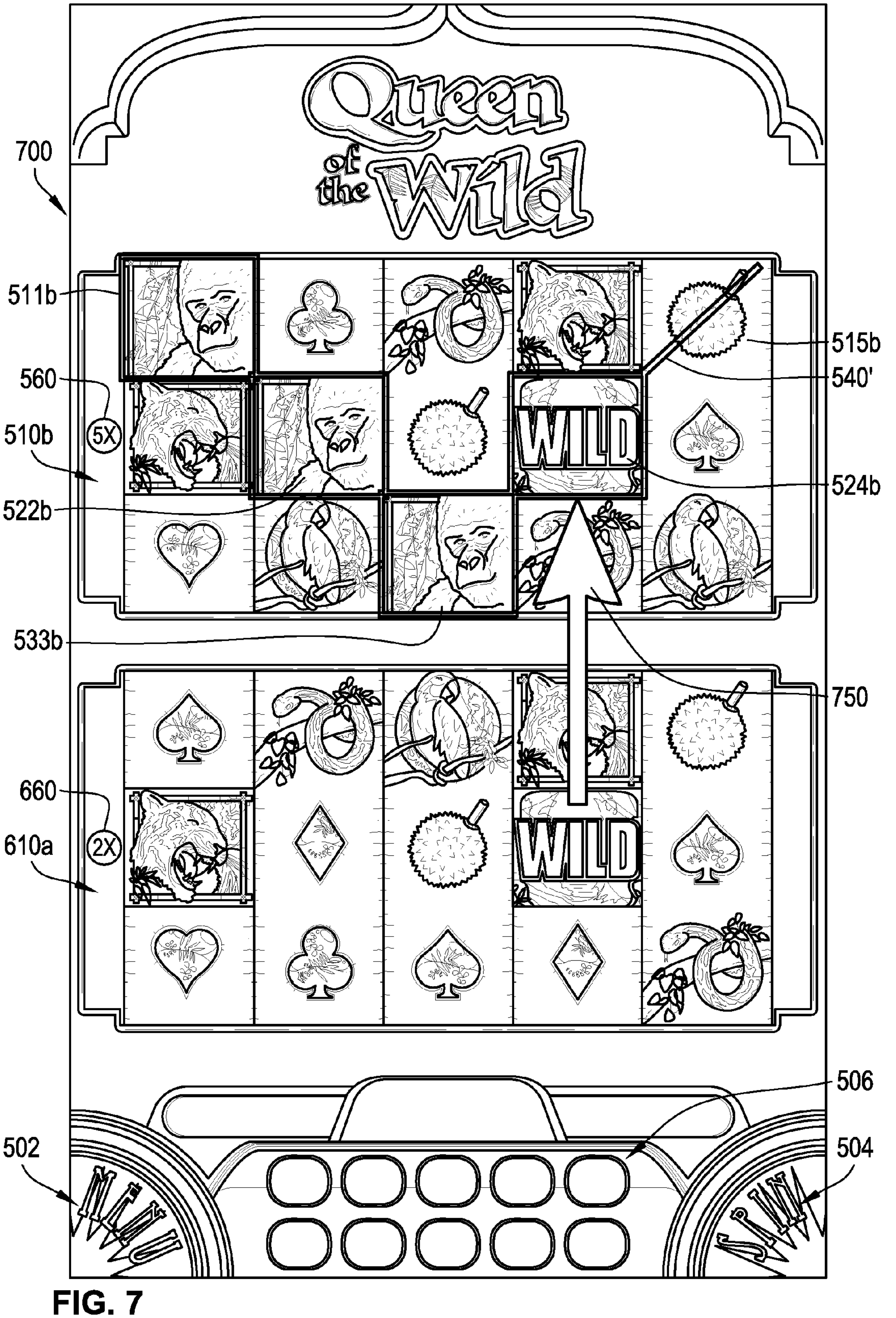
FIG. 7 is a depiction of the second portion of the exemplary portrayal shown in FIG. 6.

FIG. 7 illustrates a second portion of the exemplary portrayal of the wagering game outcome in FIG. 6. In FIG. 7, the first symbol array 510*a* corresponding to the prior wagering game outcome is modified based on a symbol in the current wagering game outcome represented by the second symbol array 610*a*. The modified first symbol array 510*b* is populated with the same symbols as the originally populated first symbol array 510*a* (FIG. 5), except that the second row, fourth column position 524*b* is changed from a DIAMOND symbol to a WILD symbol responsive to the presence of the WILD symbol in the second row, fourth column position 624*a* of the second symbol array 610*a*. An arrow 750 overlaid on and between the symbol arrays 610*a*, 510*b* depicts the translation of the symbol from symbol position 624*a* to symbol position 524*b* and provides a visual cue to a player representing the enhancement of symbol position 524*b* to now include a WILD symbol.

Once the first symbol array 510*a* of FIGS. 5-6 is modified to form the modified first symbol array 510*b* such as is shown by way of example in FIG. 7, a payline 540' highlights the symbols in the symbol positions 511*b*, 522*b*, 533*b*, 524*b*, 515*b* to indicate a winning combination. In the modified first symbol array 510*b*, the winning combination in the payline 540' includes not only the three GORILLA symbols (at positions 511*b*, 522*b*, 533*b*), but also the WILD symbol (at position 524*b*). As depicted, the winning combination is highlighted similarly to the winning combination discussed in connection with FIG. 5.

An award is provided based on the winning combination along the payline 540'. In some aspects of the present concepts, the amount of the award provided for a modified prior outcome, such as symbol array 510*b*, is based on the same paytable applicable to all base wagering games. In other aspects of the present concepts, the amount of the award provided for a modified prior portrayal, such as symbol array 510*b*, is based on a different paytable than that applicable to (current) base wagering games. In other aspects of the present concepts, the award provided for a modified prior outcome, such as symbol array 510*b*, is based on the improvement in any winning combinations of the modified first symbol array 510*b*, relative to the unmodified first symbol array 510*a*. For example, the award is based on a difference between the paytable value associated with the three GORILLA combination in the first symbol array 510*a* and the value associated with the three GORILLA plus WILD combination (e.g., a four GORILLA combination as the WILD symbol can be considered a fourth GORILLA). Thus, the randomly generated outcome associated with the second play of the wagering game, represented in FIGS. 6-7 as symbol array 610*a*, is used to modify a prior outcome associated with a prior play of the wagering game, such as the first play of the wagering game represented in FIG. 5 as symbol array 510*a*.

With reference to the example of FIGS. 5-7, a paytable provides an award of amount X for a three GORILLA symbol combination and an award of amount X+Y for a four GORILLA symbol combination. The gaming system thus provides a first award of amount X following the first game play in which a first wager is input, at least a first payline 540 is selected and the (as of yet unmodified) first symbol array 510*a* is populated and displayed to reveal the illustrated three GORILLA symbol combination along payline 540. Following input of a second wager, selection of one or more paylines, and initiation of the second game play, the second symbol array 610*a* is populated and displayed. As noted above with respect to FIG. 7, the first symbol array 510*a* is modified to display the modified first symbol array 510*b* with the four GORILLA symbol combination. The gaming system provides opportunities for at least a second award to be provided that is associated with the modified first symbol array 510*b*. Some embodiments of the present disclosure provide for the second award to be in the amount of X+Y (the value associated with the four GORILLA symbol combination) while other embodiments provide for the second award to be in the amount of Y (the value associated with the improvement of the four GORILLA symbol combination, relative to the three GORILLA symbol combination).

Figure 8:
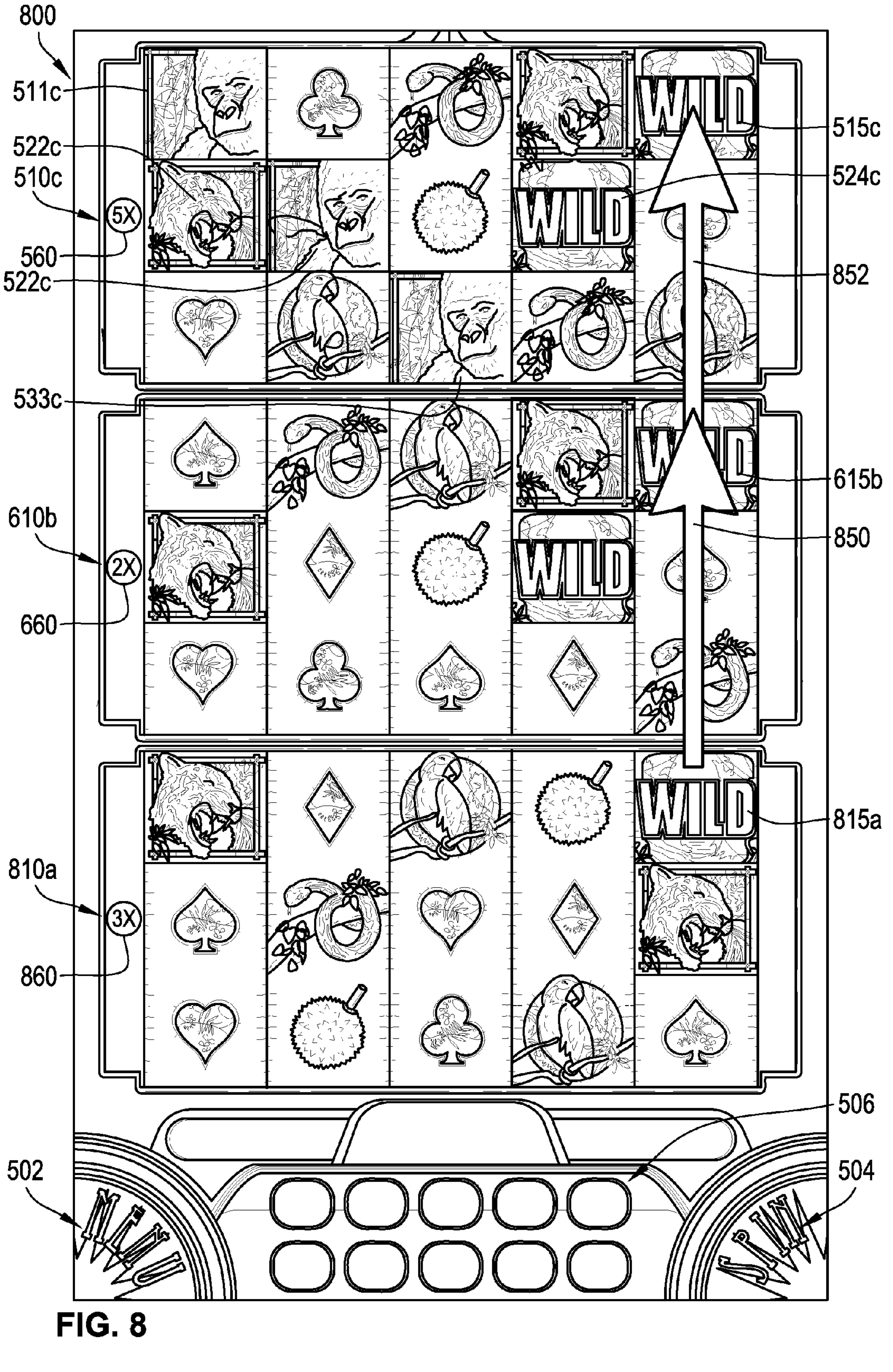
FIG. 8 is a depiction of another exemplary portrayal of a wagering game outcome that can follow the wagering game outcome shown in FIG. 7.

FIG. 8 shows a representation of yet another wagering game outcome that follows the depiction in FIG. 7. The depiction 800 of FIG. 8 portrays three symbol arrays 810*a*, 610*b*, 510*c* and omits for simplicity an intermediary representation showing symbol array 810*a* with unmodified second symbol array 610*a* and modified symbol array 510*b*. A third symbol array 810*a* is shown at the bottom of the display. In a third play of the wagering game, following the first two plays of the wagering game represented in FIGS. 5-7, the third symbol array 810*a* is populated with randomly selected symbols after receipt of a wager and any required player input(s), such as selection of one or more paylines. The third symbol array 810*a* is a three by five symbol array, like the first and second symbol arrays. The second symbol array 610*a* from FIG. 7 is modified according to the WILD symbol in the third symbol array to generate the modified second symbol array 610*b* shown in FIG. 8. The modified first symbol array 510*b* from FIG. 7 is modified again to form a twice-modified first symbol array 510*c* shown in FIG. 8. The twice-modified symbol array 510*c* is shown near the top of the display, the modified second display array 610*b* is shown in the middle, and the third symbol array 810*a* is shown near the bottom of the display. Thus, each of the symbol arrays 510*c*, 610*b*, 810*a* can be displayed simultaneously in distinct regions of the display device 112. Of course, in other display configurations, one or more of the symbol arrays (e.g., 510*c*, 610*b*, 810*a*) may optionally be displayed on separate displays.

In FIG. 8, the third symbol array 810*a* includes a WILD symbol in the first row, fifth column symbol position 815*a*. Similar to the modifications discussed in connection with FIG. 7, the corresponding symbol positions of the first and second symbol arrays 510*b*, 610*a* of FIG. 7 are modified by being replaced with WILD symbols. For example, the first row, fifth column symbol position 515*b* of the modified first symbol array 510*b* of FIG. 7 is modified by the WILD symbol of the third symbol array 810*a* to yield a first row, fifth column symbol position 515*c* that is a WILD symbol. Likewise, the first row, fifth column symbol position 615*a* of the second symbol array 610*a* of FIG. 7 is modified by the WILD symbol of the third symbol array 810*a* to yield a first row, fifth column symbol position 615*b* of the modified second symbol array 610*b* shown in FIG. 8 that is a WILD symbol. Arrows 850, 852 illustrate the replacement process by connecting the first row, fifth column symbol position 815*a* in the third symbol array 810*a* to the corresponding depicted symbol positions 515*c*, 615*b* in the first and second symbol arrays 510*c*, 610*b*.

As discussed above, awards are provided for the modified prior outcomes, such as according to the paytable award value (or improvement in award value) indicated by the modified symbol arrays 510*c*, 610*b* shown in FIG. 8. For example, a paytable for the wagering game may specify an award is indicated for two SPADE symbols and two WILD symbols (e.g., four SPADE symbols) along the payline in the modified second symbol array 610*b* including the first row, first column symbol position; second row, second column symbol position; third row, third column symbol position; second row, fourth column symbol position; and first row, fifth column symbol position 615*b*. The pay table may also specify an award is indicated for three GORILLA symbols and two WILD symbols (e.g., five GORILLA symbols) along the payline in the twice-modified second symbol array 510*c* including the first row, first column symbol position 511*c*; second row, second column symbol position 522*c*; third row, third column symbol position 533*c*; second row, fourth column symbol position 524*c*; and first row, fifth column symbol position 515*c*. As noted above, the awards associated with the modified, previously displayed symbol arrays can be provided according to the improvement in the awards indicated by the modified arrays 610*b*, 510*c*, relative to the awards indicated by the earlier arrays 510*b*, 610*a*.

Thus, the randomly determined outcome of the wagering game that is represented in the symbol array 810*a* potentially modifies the outcomes associated with the prior symbol arrays 610*a*, 510*b*, shown in FIG. 7, by modifying the prior symbol arrays, in the manner indicated in FIG. 8. Furthermore, the nature of the modification of the prior symbol arrays 610*a*, 510*b* (and thus the increase in associated award value, if any) is dictated at least in part by the symbols populating the third symbol array 810*a*, and by the symbols populating the prior symbol arrays 610*a*, 510*b*.

FIGS. 5-8 represent one possible sequence of three separate game plays of a wagering game in accord with at least some aspects of the present concepts. In general, the present concepts include use of a current game play to modify an outcome of one or more prior wagering game plays, with the potential for additional awards to be provided for such one or more prior wagering game plays. Accordingly, one or more prior symbol arrays can be modified responsive to the current symbol array. In some instances, an award associated with an earlier symbol array may be modified and a new award provided according to the increase in value of the associated award, relative to an award already awarded responsive to such earlier symbol array. In other instances, an earlier symbol array not associated with a winning outcome or award can be modified according to the current symbol array to now yield a winning outcome (e.g., a left-to-right two symbol losing outcome may be modified to yield a left-to-right three symbol winning outcome) with a corresponding award.

As stated above, in accord with at least some aspects of the present concepts, successive wagering games can be carried out while retaining one or more previous outcomes (e.g., populated symbol arrays, etc.) which are then able to be modified based on the current wagering game outcome, and providing awards not only for any winning outcome(s) in the current wagering game, but also for any improvement in an outcome in such retained one or more outcome(s) (e.g., from a non-winning combination to a winning combination, etc.) by reason of the modification(s). In at least one aspect of the present concepts, only the two most recent previous symbol arrays are retained (e.g., symbol arrays 510*c*, 610*b* in FIG. 8), such that initiation of a fourth wagering game results in the first symbol array (e.g., symbol array 510*c* in FIG. 8) being dropped from the displayed wagering game on the display device, and the second and third symbol arrays are displayed and potentially modified according to a fourth symbol array populated according to a fourth randomly generated outcome of the wagering game. In other embodiments, only the most recent previous symbol array is retained, and in still other embodiments, more than two of most recent previous symbol arrays are retained, such as three or four of the most recent previous symbol arrays. In accord with at least some aspects of the present concepts, a symbol array that is no longer displayed on the display may optionally still be retained for purposes of modification. In accord with such aspect, a greater number of prior outcomes may be retained and potentially modified than may be simultaneously displayed on one or more displays of the wagering game machine.

Further aspects of the present disclosure are described generally below in reference to FIGS. 5-7 to describe additional modifications of earlier-displayed symbol arrays based on currently-displayed symbol array in iterative wagering game play. However, it is noted that the additional features described in connection with FIG. 7 can generally apply to a wagering game outcome where multiple previous randomly determined outcomes (e.g., symbol arrays) are displayed simultaneously with a current randomly determined outcome and where one or more of the previous randomly determined outcomes can be modified according to the current randomly determined outcome.

In some instances, players are allowed to save their game history such that the game history of previously populated and/or partially modified symbol arrays can be loaded prior to initiating a game play at a different time and/or place. The saved game history can be loaded prior to initiating subsequent game play, such that the first game play at the different time/place modifies the previous arrays loaded according to the game history. Game histories can be saved via networked information storage devices (such as a server), player cards with embedded data storage capacity, printed tickets, and/or other information storage devices suitable for retrievably storing information.

In some embodiments, the amount of the award associated with the modified first symbol array 510*b* can be based, at least in part, on the amount of the first wager that resulted in the outcome represented by symbol array 510*a*, the amount of the second wager that resulted in the outcome represented by symbol array 610*a* that then modified symbol array to yield symbol array 510*b*, or a combination thereof (such as an average or weighted average, for example). In the exemplary depictions of wagering game outcomes described in connection with FIGS. 5-8, for example, the wager associated with the first game play outcome associated with the first symbol array 510*a*, is sufficient to provide a 5× multiplier for any winning combinations. The 5× multiplier is indicated by the multiplier indicator 560 generally displayed at the left of the first symbol array 510*a*. For example, the first wager can be determined by the product of the number of paylines selected and the multiplier selected, such as a 25 credit wager for 5 paylines and a 5× multiplier. Thus, the winning combination of three GORILLA symbols in the outcome shown in the first symbol array 510*a* is awarded according to the paytable value indicated by the three GORILLA combination, multiplied by five. Similarly, the second wager is sufficient to provide a 2× multiplier for any winning combinations in the second outcome (e.g., 10 credits), as indicated by the multiplier indicator 660, and the third wager is sufficient to provide a 3× multiplier (e.g., 15 credits), as indicated by the multiplier indicator 860.

In some examples, the wagers associated with each of the previous outcomes that remain displayed (and subject to awards for modified and/or improved outcomes) track with the previous outcomes, even while the current wagers change. Thus, the award provided for the four GORILLA winning combination in the modified first symbol array 510*b* of FIG. 7 is awarded according to the 5× multiplier, even though the current wager is only sufficient for a 2× multiplier (for the current outcome). As depicted in FIGS. 5-8, the respective multiplier indicators 560, 660, 860 continue to be displayed alongside the respective modified versions of the previous outcomes (e.g., the 5× indicator 560 is displayed alongside the modified and twice-modified first symbol arrays 510*b*, 510*c*) to visually indicate the tracking of the previous wager amounts with the modified outcomes.

Where the amount of the award is based on the amount of the first wager, rather than the second wager, any potential awards associated with subsequent modifications of the earlier symbol outcomes are tied to the initial wager amount, rather than the current wager amount. In such examples, the earlier wager amount has an influence on the awards provided during subsequent plays of the wagering game and the extent of that influence can be expressed as an acquired equity in potential future outcomes. In such examples, the acquired equity can be associated with an expected value computed for any symbol array(s) subject to potential modification during current and/or subsequent game plays. The expected value is influenced, for example, by the amount of the earlier wager, the contents of the earlier symbol array(s), factor(s) influencing the modification/replacement processes (such as bonus events, community events, etc.), and so on. The equity or expected value associated with any earlier outcomes (e.g., symbol arrays) that are awarded according to the earlier wager, rather than the current wager, is thus an expression of the value of the earlier symbol arrays (based on their ability to be modified to provide new and/or increased awards) independent of the current and/or subsequent wager amounts.

By contrast, examples where awards for modifications in earlier symbol arrays are provided according to the current wager amount do not generally account for acquired equity associated with earlier symbol arrays. Any awards that are portrayed in connection with modifications to the earlier symbol arrays are still provided in accordance with the current wager amount, so the wager outcome can be computed without regard to earlier wager amounts. Because the earlier wager amounts do not influence future awards, no acquired equity is assigned.

In a related manner, equity is also associated with earlier symbol arrays in examples where awards are provided for the total value of any winning combinations in earlier symbol arrays, rather than only awarding improvements. For example, earlier symbol arrays with winning combinations may be awarded during subsequent game plays so long as they continue to be displayed, regardless of whether the winning combination was improved. Thus, a winning combination in a current symbol array provides an award in the same amount (or greater amount, if a modification improves the result) during the next game play (and any further game plays while the symbol array continues to be displayed). In such an example, any such award associated with the subsequent game play(s) can be expressed as an expected value of the earlier symbol arrays based on any winning combinations in the earlier symbol arrays. Thus, for example, a player that decides to end a wagering gaming session comprising a sequence of game plays while one or more symbol arrays with winning combinations are displayed (and would consequently provide a known award amount during subsequent game plays in accord with at least some aspects of the present concepts), regardless of whether the winning combinations are improved by modifications to the earlier symbol arrays, has an expected value that can be determined based, at least in part, on the amount of the awards that would be attributed to such displayed winning combinations. In such examples, the wagering game system can also be operated to provide results for the winning combinations in the earlier symbol arrays according to the earlier wagers to prevent players from increasing their wagers once a winning combination in an earlier symbol array is observed. Additionally or alternatively, players can be required to maintain a constant wager amount during each wagering gaming session so as to prevent such effects.

Thus, some aspects of the present concepts allow players to acquire equity associated with earlier symbol arrays, when future awards associated with such symbol arrays are provided independent of current (or subsequent) wager amounts and/or game outcomes. The amount of acquired equity can be computed as an expected value associated with any awards from the wagering game that are independent of current (or subsequent) wager amounts and/or game outcomes. In some instances, the amount of game equity can be saved to be retrieved prior to initiating the game at a different time and/or place, similar in some respects to the discussion of retrieving stored game histories above. In some aspects of the present concepts, players may be required (or provided with an option) to cash out their game equity (e.g., expected value associated with any earlier symbol arrays, independent of current and/or subsequent wager amounts and/or outcomes), if any, at the end of a gaming session comprising a sequence of wagering games such that a desired expected value of the wagering game is realized.

Some embodiments of the present disclosure allow for modification and/or replacement of one or more symbols in a previous outcome, such as a populated symbol array, only if one or more predetermined triggering symbols are present in the second or current outcome (e.g., symbol array). For example, the triggering symbol can be a WILD symbol, or a symbol in a predetermined hierarchy range or level of possible symbols. For example, the highest symbol in the hierarchy for the wagering game (e.g., the symbol for which winning combinations provide the greatest awards) can be the triggering symbol. In some instances, symbols in multiple levels ("tiers") of the hierarchy can be triggering symbols.

The triggering symbol can additionally or alternatively be a dedicated symbol that, when present in the second symbol array 610*a*, or when present in a particular symbol position or in a range of symbol positions (e.g., in a fifth reel) of the second symbol array 610*a*, allows the first symbol array (e.g., symbol array 510*a* in FIG. 6) to be modified. For example, the first symbol array (e.g., symbol array 510*a* in FIG. 6) can be modified by having symbols replaced with symbols matching one or more symbols in corresponding positions of the second symbol array (e.g., symbol array 610*a* in FIG. 6), such as, for example, WILD symbols, symbols at a particular hierarchy tier, symbols in a predetermined position, etc., if the second symbol array includes the triggering symbol.

In another aspect, the triggering symbol can optionally comprise a dedicated symbol that is required to be present in both the first outcome (e.g., symbol array 510*a* in FIG. 6) and in the second outcome (e.g., symbol array 610*a* in FIG. 6) before the second outcome can modify the first outcome.

The triggering symbol can include a symbol that is not disposed along a payline or otherwise included in a winning combination for the wagering game (e.g., the modification feature can be awarded according to a scatter pay) and can comprise any symbol(s) disposed in any location(s) in one or more of the displayed outcomes. The exemplary outcome portrayal via a previous symbol array modification shown in the wagering game depiction 700 of FIG. 7 modifies a previous game play symbol array by replacing a symbol in a corresponding symbol position of the current game play symbol array. That is, the second row, fourth column position 524*b* in the modified first symbol array 510*b* is replaced with a WILD symbol because the WILD symbol is populated in the second row, fourth column position 624*a* of the second symbol array 610*a*. It may be that the WILD symbol is itself a triggering symbol and the earlier symbol array following such occurrence of a triggering condition, is modified by changing the symbols in the symbol positions corresponding to the positions populated with the triggering symbol to be the same as the triggering symbol (changed to the WILD symbol). However, in some aspects of the present concepts, the triggering symbol can be distinct from symbols that are replaced in the first symbol array (e.g., replacement symbols).

In at least some aspects of the present concepts, the modification of the first symbol array 510*a* is not achieved by replacing a symbol in the first symbol array with a symbol that appears in the second symbol array. In some examples, a symbol in the first symbol array 510*a* can be replaced according to an indication provided by one or more "replacement indicator" symbols in the second array 610*a*. For example, a replacement indicator symbol can appear in the second symbol array 610*a* that specifies replacement of a WILD symbol (or other symbol), but is not itself a WILD symbol. The corresponding symbol location in the first symbol array 510*a* (or one or more other symbol positions in the first symbol array 510*a*) can be populated with a WILD symbol (or other symbol indicated by the replacement indicator) in response to the inclusion of the replacement indicator symbol in the second symbol array 610*a*.

In at least some embodiments of the present disclosure, earlier displayed game outcomes can be modified by replacing and/or modifying symbols in earlier symbol array(s) at symbol positions other than the locations of triggering and/or replacement symbols in the current symbol array portraying the current outcome. For example, a WILD symbol (or other triggering symbol) that appears in the second symbol array 610*a* can generate a WILD symbol (or other desired replacement/modification symbol) at a predetermined location in the first symbol array that is related to, but distinct from, the location of the WILD symbol in the second symbol array. Furthermore, the occurrence of a WILD symbol (or other triggering symbol) that appears in the second symbol array 610*a* can generate a WILD symbol (or other desired replacement/modification symbol) at a randomly selected location in the first symbol array. In some embodiments, the modification can be portrayed as a wandering ("floating") WILD symbol that originates at or near the position of the WILD symbol in the second symbol array 610*a* and is dynamically portrayed by video content to travel along a straight, curved, and/or winding path to stop at or near a symbol position in the first array such that the first array is modified to thereby portray the randomly determined outcome of the wagering game.

In some examples, the modification of the first symbol array 510*a* can be a random modification (or seemingly random modification) where one or more symbols in the first symbol array are re-populated in response to a triggering symbol or triggering symbols, or other triggering event. For example, rather than replacing the symbol position 524*b* with a WILD symbol, the fourth column of the modified symbol array 510*b* can be rendered with dynamic content illustrating a series of symbols passing through the fourth column, similar to the portrayal of a single spinning reel located in the fourth column, and the fourth column can be re-populated with symbols corresponding to the randomly determined outcome. In still other examples, only the symbol at the symbol position 524*b* can be re-populated. In still other examples, the entire symbol array 510*b*, or any symbols not part of an earlier winning combination, can be populated with new symbols in response to a triggering symbol in the second symbol array 610*a*.

Furthermore, in some examples, the symbols that are modified and/or replaced in the first symbol array (e.g., symbol array 510*a* in FIG. 6) can be expanding symbols such as, but not limited to, an expanding WILD. For example, a WILD symbol in the second symbol array 610*a* can generate a WILD symbol in a corresponding symbol position in the first symbol array 510*b*, and the WILD symbol in the first symbol array 510*b* is then expanded to occupy additional symbol positions in the modified first symbol array 510*b*. In some examples, an expanding WILD symbol can expand to occupy continuous, adjacent symbol positions of the first symbol array.

Some exemplary portrayals disclosed herein contribute to player anticipation, excitement, and enjoyment by allowing players to anticipate how the previously displayed symbol arrays can be modified in a manner that increases the award associated with the symbol arrays, such that an additional award is provided. Because players can view the previously populated symbol arrays continuously displayed during the current symbol array generation, players can anticipate how subtle modifications to the earlier symbol arrays will correspond to additional awards. According to some of the present concepts modifications, if any, are provided that do not negate existing winning combinations, if any, in the previous symbol array, such that the modifications result in increased award values. Where arrays are modified by replacing symbols with WILD symbols, any winning combinations in the modified array are generally not negated, because even if the replaced symbol was already a part of a winning combination, the WILD symbol is interchangeable with the replaced symbol. Replacing symbols with WILD symbols ensures that the award indicated by the modified symbol array is equal to, or greater than, the unmodified symbol array, because a WILD symbol can generally replace any symbol in the earlier symbol array. Thus some aspects of the present concepts provide for undertaking the modification operation in a manner that allows for modifications to be either neutral modifications (e.g., no change in award value) or positive modifications (e.g., increase in award value), but not negative modifications (e.g., decrease in award value).

In some instances, the modification features described herein to modify/change one or more symbols in an earlier-displayed symbol array based on a currently-displayed outcome can be activated and/or adjusted in response to events occurring within a wagering game base game and/or bonus game. Adjustments can be made to the number and/or type(s) of symbols modified and/or to the number and/or types of symbols in the current symbol array that trigger a modification of the earlier symbol array. Furthermore, adjustments can be in response to receiving an additional or supplemental wager from a player, such as a supplemental wager placed prior to display of the second symbol array 610*a*. A player can optionally be given an option to submit an additional wager to activate enhancements to the modification operation (such as increasing the number and/or type(s) of symbols modified). For example, the supplemental wager can adjust the modification operation such that two or more symbol positions in the first symbol array 510*b* are modified/replaced with a WILD symbol when a WILD symbol appears in the second symbol array 610*a*. During game play, such modification operations (or enhancements thereof) can also be activated in response to bonus events, community events, etc.

In some examples, the modification operation can be enhanced ("boosted") by adjusting the number of previous wagering game outcomes, such as, but not limited to, symbol arrays, retained on the display. The number of previously generated symbol arrays displayed may be temporarily increased, for example, during a bonus event, a community event, following a predetermined winning outcome, etc. For example, a bonus event can be provided where previous symbol arrays remaining on the display for potential modification (and awards associated with outcome improvements associated with the modification(s)) can be temporarily increased from one previous symbol array to two previous symbol arrays. Furthermore, the previously generated symbol arrays can be allowed to stockpile during a bonus period (e.g., a free spin bonus) or other temporary period such that the total number of displayed symbol arrays for potential modification at the end of the bonus period is based on the total number of game plays during the bonus period. At the conclusion of such a bonus period, the number of previous symbol arrays simultaneously displayed can be returned by removing all but the most recent earlier symbol array(s).

In some examples, modifications to the earlier displayed symbol arrays can be in the form of activating additional paylines in one or more of the earlier symbol arrays that were not previously active. Thus, even where the symbols in the earlier symbol arrays are not modified, the earlier symbol array can be modified to indicate additional awards by activating additional paylines. Awards can be provided based on any winning combinations in the additional paylines that were not previously awarded. The additional paylines can optionally be activated only when a triggering symbol (or a combinations of symbols) is (are) included in the current symbol array. For example, a winning combination in the current symbol array can also result in activation of additional paylines for the earlier symbol arrays and providing any awards indicated. Additionally, the earlier symbol array(s) can be modified by replacing one or more symbols and activating additional paylines.

In addition to activating additional paylines, the award associated with the earlier symbol array(s) can be modified by changing the rules by which the earlier symbol array indicates an award. For example, the earlier symbol array can indicate an award according to an "all hearts wild" rule to indicate additional and/or improved outcomes, relative to the initially provided outcome. In particular, even though the symbols occupying the earlier symbol array are unchanged, modifying the rules by which the earlier symbol array indicates an award allows the earlier symbol array to indicate additional and/or improved awards that can then be provided to the player.

Additionally or alternatively, award(s) can optionally be provided based on a scatter pay formula across the modified symbol array (e.g., the modified first symbol array 510*b* in FIG. 7) or across a combination of multiple displayed symbol arrays (e.g., based on symbols in the modified first symbol array 510*b* and the second symbol array 610*a* in FIG. 7). Such scatter pay awards can be provided before and/or after the modification operation is carried out. Scatter pay payouts can be activated based on one or more symbols included in the current symbol array or based on game outcomes, bonus events, community events, etc.

Each of these embodiments and obvious variations thereof is contemplated as falling within the spirit and scope of the claimed invention, which is set forth in the following claims.

What is claimed is:

1. A gaming system configured to play at least one casino wagering game comprising:

one or more wager input devices, the one or more input devices comprising a first input device configured to detect a physical item associated with a monetary value that establishes a credit balance, a second input device configured to receive a cashout input that initiates a payout from the credit balance, and at least one other input device configured to receive a player input;

at least one processor;

at least one display device; and at least one memory device storing instructions that, when executed by the at least one processor, cause the gaming system to:

initiate display, via the at least one display device, of a randomly populated first symbol array responsive to a receipt of an input, via the at least one other input device, indicative of a first wager to play corresponding to a first wagering game and covered by the credit balance, provide a first award, if any, associated with the first symbol array of the first wagering game, after providing the first award, and while continuing to display the first symbol array via the at least one display device, initiate display, via the at least one display device, of a randomly populated second symbol array responsive to a receipt of an input, via the at least one other input device, indicative of a second wager to play corresponding to a second wagering game and covered by the credit balance, provide a second award, if any, associated with the second symbol array of the second wagering game, modify one or more symbols in the first symbol array based at least in part on one or more symbols in the second symbol array, thereby generating a modified first symbol array, and provide a third award, if any, associated with the modified first symbol array.

2. The gaming system according to claim 1, wherein the one or more symbols in the first symbol array are modified by replacing the one or more symbols in the first array with one or more symbols in the second array arranged at positions in the second array corresponding to the positions of the one or more symbols in the first symbol array.

3. The gaming system according to claim 2, wherein the one or more symbols in the first symbol array are replaced responsive to the one or more symbols in the second symbol array being one or more replacement triggering symbols.

4. The gaming system according to claim 3, wherein the one or more replacement triggering symbols include a wild symbol.

5. The gaming system according to claim 1, wherein the one or more symbols in the second symbol array are arranged at one or more indicated replacement positions of the second symbol array.

6. The gaming system according to claim 1, wherein the first symbol array and the second array are simultaneously displayed in distinct regions of the at least one display device.

7. The gaming system according to claim 6, wherein the distinct regions do not overlap.

8. The gaming system according to claim 1, wherein a quantity of the one or more symbols modified in the first symbol array is determined, at least in part, according to at least one of a bonus event trigger or an outcome associated with one or both of the first symbol array and the second array.

9. The gaming system according to claim 1, wherein the third award is provided according to an increase in value, if any, between the first symbol array and the modified first symbol array, wherein the increase in value is determined according to a pay table that maps winning combinations of symbols in populated symbol arrays to award amounts.

10. The gaming system according to claim 1, wherein the third award is provided according to a value associated with the modified first symbol array according to a pay table, and wherein the first award and second award are provided according to values associated with the first symbol array and second symbol array, respectively, according to the pay table.

11. The gaming system according to claim 1, wherein the third award is based, at least in part, on the first wager.

12. The gaming system according to claim 1, wherein the third award is based, at least in part, on the second wager.

13. The gaming system according to claim 1, wherein the third award is independent of the second wager.

14. The gaming system according to claim 1, wherein the at least one memory device further stores instructions that cause the gaming system to:

display, via the at least one display device, a randomly populated third symbol array responsive to a receipt of an input, via the at least one other input device, indicative of a third wager while concurrently displaying the first symbol array and the second symbol array on the at least one display device, provide a fourth award, if any, associated with the third symbol array, modify one or more symbols in the second symbol array based at least in part on one or more symbols in the third symbol array, thereby generating a modified second symbol array, and provide a fifth award, if any associated with the modified second symbol array.

15. The gaming system according to claim 14, wherein the at least one memory device further stores instructions that cause the gaming system to:

modify one or more symbols in the modified first symbol array based at least in part on one or more symbols in the third symbol array, thereby generating a twice-modified first symbol array, display the twice-modified first symbol array while displaying the modified second symbol array and the third symbol array simultaneously in distinct regions of the at least one display device, and provide a sixth award, if any, associated with the twice-modified first symbol array.

16. The gaming system according to claim 1, wherein the at least one memory device further stores instructions that cause the gaming system to increase the total number of symbol arrays simultaneously displayed, modified, and awarded in response to activation of an enhancement.

17. The gaming system according to claim 1, wherein the at least one memory device further stores instructions that cause the gaming system to:

provide an additional award, if any, associated with both the modified first symbol array and the second symbol array simultaneously displayed via the display device, wherein the additional award is determined according to a scatter pay across both the modified first symbol array and the second symbol array.

18. A wagering gaming system comprising:

one or more input devices comprising a first input device configured to detect a physical item associated with a monetary value that establishes a credit balance, a second input device configured to receive a cashout input that initiates a payout from the credit balance, and at least one other input device configured to receive a player input;

at least one processor configured to conduct a wagering game on the wagering game system;

a display device; and at least one memory device storing instructions that, when executed by the at least one processor, cause the gaming system to:

receive an input, via the at least one other input device, indicative of a wager covered by the credit balance, randomly determine an outcome of the wagering game, the outcome of the wagering game indicated by a plurality of symbols;

display the outcome in a first symbol array displayed on the display device;

display on the display device, while displaying the first symbol array, a second symbol array indicating a prior outcome from a prior wagering game;

modify the second symbol array based at least in part on one or more symbols in the first symbol array;

determine a difference between an award corresponding to the modified second symbol array and a prior award, if any, associated with the second symbol array during the prior wagering game according to the prior outcome; and award the difference if the award corresponding to the modified second symbol array is greater than the prior award corresponding to the second symbol array.

19. The wagering gaming system according to claim 18, wherein the award indicated by the second symbol array is modified by replacing one or more symbols in the second symbol array.

20. The wagering gaming system according to claim 18, wherein the award indicated by the second symbol array is modified by activating additional paylines in the second symbol array.

* * * * *